United States Patent
Sugita et al.

[11] Patent Number: 5,274,564
[45] Date of Patent: Dec. 28, 1993

[54] METHOD AND APPARATUS FOR MACHINING A NON-CIRCULAR WORKPIECE

[75] Inventors: Kazuhiko Sugita, Anjo; Norio Sakakibara, Kariya; Nobumitsu Hori, Ichinomiya; Yoichi Yamakawa, Nishikasugai; Toshihiro Takahashi, Nishio, all of Japan

[73] Assignee: Toyoda Koki Kabushiki Kaisha, Kariya, Japan

[21] Appl. No.: 760,386

[22] Filed: Sep. 16, 1991

[30] Foreign Application Priority Data

Sep. 20, 1990 [JP] Japan .................. 2-253171

[51] Int. Cl.⁵ .................. G06F 15/46; B23B 3/28
[52] U.S. Cl. .................. 364/474.29; 82/18; 82/118; 82/137; 82/904
[58] Field of Search .......... 364/474.29; 82/18, 137, 82/123, 118, 904; 318/561

[56] References Cited

U.S. PATENT DOCUMENTS

| | | | |
|---|---|---|---|
| 4,203,062 | 5/1980 | Bathem | 82/137 |
| 4,564,914 | 1/1986 | Ballough et al. | 82/18 |
| 4,646,595 | 3/1987 | Slee | 82/118 |
| 5,054,340 | 8/1991 | Sugita et al. | 82/18 |

OTHER PUBLICATIONS

Peter A. Stark, "Introduction to Numerical Methods" 1970, 319–327.

Primary Examiner—Jerry Smith
Assistant Examiner—Jim Trammell
Attorney, Agent, or Firm—Oblon, Spivak, McClelland, Maier & Neustadt

[57] ABSTRACT

An apparatus for machining a non-circular workpiece such as a piston wherein a tool is moved back and forth against the workpiece in accordance with profile data defining a desired final shape of the workpiece while the workpiece is rotated at a predetermined speed. The tool is moved by a composite movement of a linear motor driven in accordance with low frequency command values, and a piezoelectric actuator driven in accordance with high frequency command values. A numerical controller of the apparatus calculates the low frequency command values using a first Fourier series and the high frequency command values using a second Fourier series. Coefficients of the first and second Fourier series are determined using least square method in such a way that errors contained in the low and high frequency command values becomes within a predetermined limit.

7 Claims, 9 Drawing Sheets

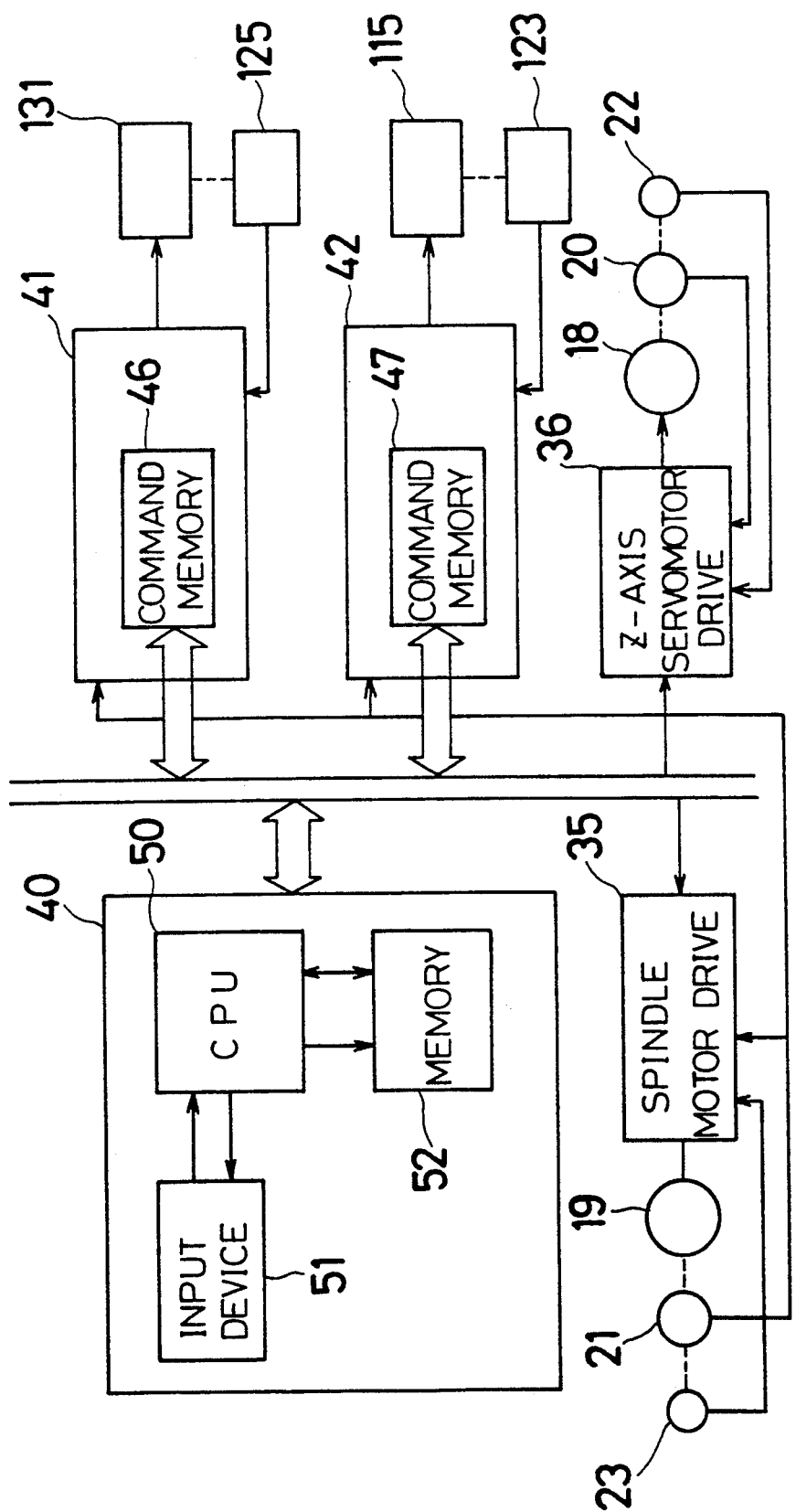

FIG. 7

| ANGULAR POSITION | RADIUS | ALLOWABLE RADIUS ERROR |
|---|---|---|
| $\theta_1$ | $r_1$ | $\Delta r_1$ |
| $\theta_2$ | $r_2$ | $\Delta r_2$ |
| $\theta_3$ | $r_3$ | $\Delta r_3$ |
| ... | ... | ... |
| $\theta_{n-1}$ | $r_{n-1}$ | $\Delta r_{n-1}$ |
| $\theta_n$ | $r_n$ | $\Delta r_n$ |

METHOD AND APPARATUS FOR MACHINING A NON-CIRCULAR WORKPIECE

BACKGROUND OF THE INVENTION

1. Field of the Invention

The present invention relates to a method and an apparatus for machining a non-circular workpiece, and more particularly to a method and an apparatus for machining a non-circular workpiece wherein a Fourier series is used in calculation of command values which are used for controlling a cutting tool of the apparatus.

2. Discussion of the Prior Art

A machining apparatus of the above-mentioned type is disclosed in the U.S. patent application No. 07/471,392, now U.S. Pat. No. 5,054,340 which was assigned to the applicant of this application.

In the apparatus, profile data defining a desired final shape of a non-circular workpiece is expanded into a Fourier series to obtain low frequency components of the profile data for actuating a low speed actuator such as a linear motor and high frequency components of the profile data for actuating a high speed actuator such as a piezoelectric actuator. A cutting tool of the apparatus is moved by the low speed actuator and the high speed actuator simultaneously. As described above, Fourier transformation is carried out to separate the profile data into low and high frequency components for driving the linear motor and the piezoelectric actuator, respectively. The Fourier transformation can also be used to improve the operational characteristic of the servo control system. The low frequency components used for moving the linear motor are referred to as low frequency command values hereinafter while the high frequency components used for moving the piezoelectric actuator are referred to as high frequency command values.

Namely, the apparatus is provided with a tool mount table lineally moved by a linear motor, and a cutting tool is mounted on the tool mount table through a piezoelectric actuator to be moved by the piezoelectric actuator with respect to the tool mount table. The cutting tool is moved by the linear motor and the piezoelectric actuator while a non-circular workpiece is rotated at a predetermined speed. The linear motor is driven in accordance with low frequency command values while the piezoelectric actuator is driven in accordance with high frequency command values. To obtain the low frequency command values and the high frequency command values, the profile data $f(\theta)$ is expanded into a Fourier series in a numerical controller of the apparatus in such a manner as given by the following expression:

$$f(\theta) = a_0 + a_1\cos\theta + b_1\sin\theta + a_2\cos2\theta + b_2\sin2\theta +$$
$$a_3\cos3\theta + b_3\sin3\theta + a_4\cos4\theta + b_4\sin4\theta + a_5\cos5\theta +$$
$$b_4\sin5\theta + a_6\cos6\theta + b_6\sin6\theta$$

The Fourier coefficients $a_0, a_1, b_1 \ldots b_6$ of the above expression are found out by Fourier transformation. In the above example, expansion is made to sixth degree.

Then, components for zero to second degrees are assigned to the linear motor while components for third to sixth degrees are assigned to the piezoelectric actuator. Accordingly, low frequency command values $XTL(\theta)$ for driving the linear motor and high frequency command values $XTP(\theta)$ for driving the piezoelectric actuator are respectively calculated using following equations:

$$XTL(\theta) = a_0 + a_1\cos\theta + b_1\sin\theta + a_2\cos2\theta + b_2\sin2\theta$$

$$XTP(\theta) = a_3\cos3\theta + b_3\sin3\theta + a_4\cos4\theta + b_4\sin4\theta + a_5\cos5\theta +$$
$$b_4\sin5\theta + a_6\cos6\theta + b_6\sin6\theta$$

The linear motor is driven in accordance with the low frequency command values $XTL(\theta)$ while the piezoelectric actuator is driven in accordance with the high frequency command values $XTP(\theta)$. As a result, the non-circular workpiece is machined into a desired profile.

In such apparatus, a desired shape of a non-circular workpiece is determined based upon a blue print thereof and is expressed by plural sets of data each of which includes an angular position ($\theta_n$), a desired radius ($r_n$) of the workpiece thereat, and an allowable error ($\Delta r_n$) with respect to the desired radius, as shown in FIG. 7. The data is prepared for each of plural angular positions which have a predetermined angular interval of 5° to 10°.

A Fourier series defines the desired profile are then calculated using the profile data. Since the expansion of the Fourier series is carried out within a limited number, for example to sixth degree, the profile defined by the Fourier series inevitably contains an error $\epsilon$, as shown in FIG. 1 (a). Although the error can be reduced by increasing the number of expansion, a problem arises that the acceleration component of command values calculated using the Fourier series is increased. The fluctuation of the acceleration component is also increased. When the acceleration component and the fluctuation thereof are large, the follow delay of the tool becomes large, whereby the machining accuracy is deteriorated.

Further, in cases where an allowable error changes in accordance with the rotational angle of the workpiece, as shown in FIG. 1 (b), the number of expansion has to be increased so that the error becomes smaller than the minimum value Emin of the allowable error $\Delta r$. Therefore, the number of the expansion cannot be reduced in such case.

SUMMARY OF THE INVENTION

Accordingly, it is an object of the present invention to provide an improved apparatus for machining a non-circular workpiece which is capable of accurately calculating command values using a Fourier series to move a cutting tool, thereby improving the machining accuracy.

Another object of the present invention is to provide an improved apparatus for machining a non-circular workpiece which is capable of increasing the accuracy of command value calculation using a Fourier series without increasing the number of expansion thereof.

Further object of the present invention is to provide a method for obtaining accurate command values using a Fourier series to move a cutting tool.

Briefly, an apparatus for machining a non-circular workpiece according to the present invention is provided with input means for inputting profile data defining a desired final shape of the workpiece. The profile data is composed of plural data prepared for plural angular positions of the workpiece, each of which includes an angular position of the workpiece and a desired radius. The apparatus is further provided with means for calculating command values indicating positional change of said tool using a Fourier series, and determining means for determining coefficients of the Fourier series using least square method in such a way that the difference between a profile defined by the Fourier series and an ideal profile defined by the profile data becomes smaller than a predetermined allowable error. Control means effects calculation by the calculating means using coefficients determined by the determining means to obtain command values. The tool is moved in accordance with the obtained command values to machine the workpiece into the desired final shape.

With this configuration, a Fourier series having desired accuracy can be obtained even if the number of expansion is limited to relatively small number. This decreases the acceleration component and the fluctuation thereof, thereby allowing the apparatus to machine the workpiece at a high speed.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiment when considered in connection with the accompanying drawings, in which:

FIG. 1 (b) is a chart showing an allowable error;

FIG. 5 is a block diagram showing a numerical controller according to the preferred embodiment of the present invention;

Figure 6A:
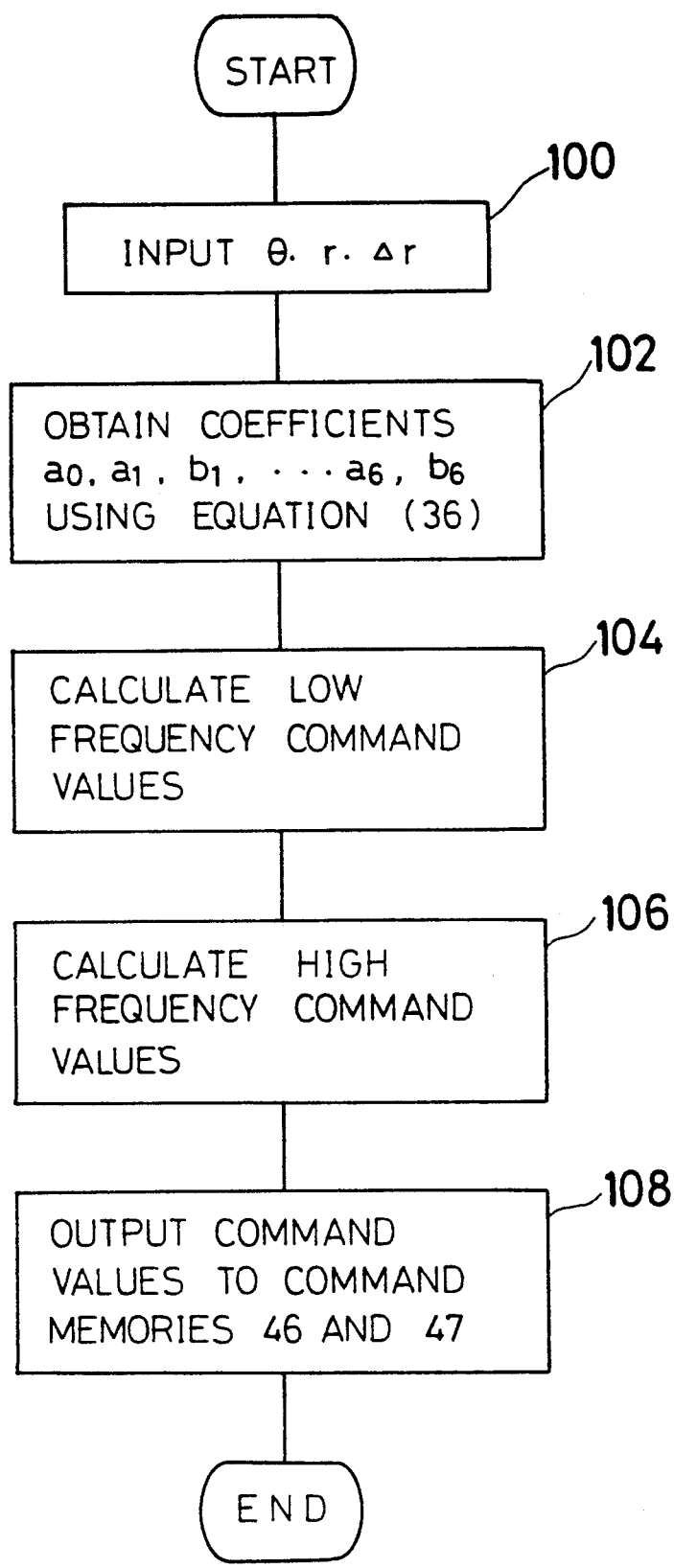
Figure 6:
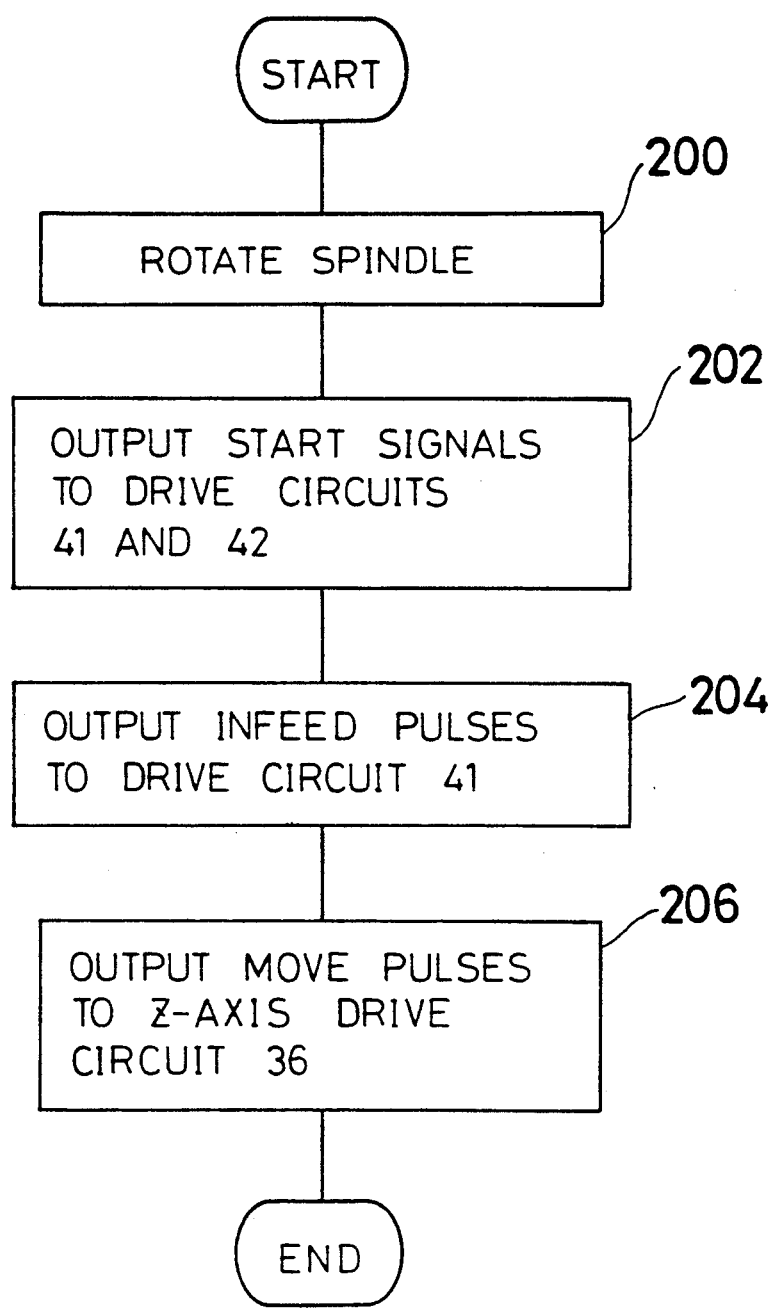
Figure 8:
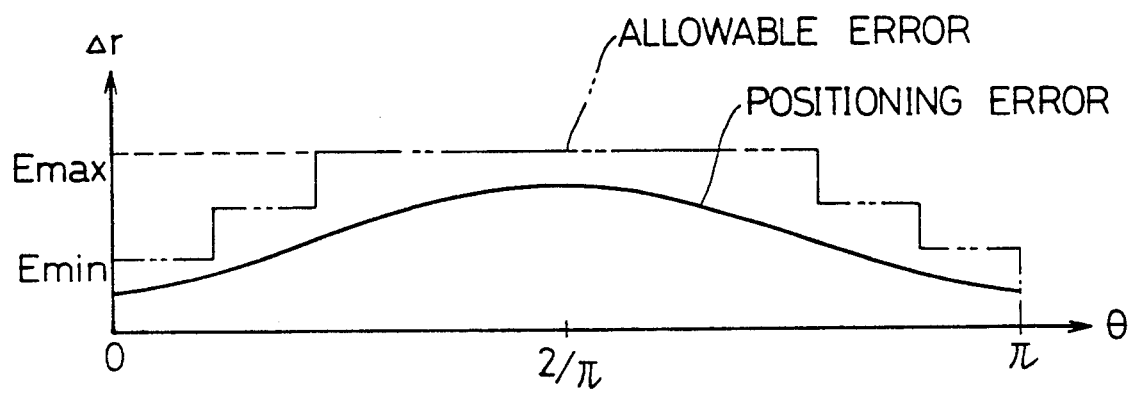

FIGS. 6 (a) and 6 (b) are flow charts illustrating a process of a CPU of the numerical controller shown in FIG. 5;

FIG. 7 is a chart showing profile data given for machining a non-circular workpiece; and FIG. 8 is a chart showing a positioning error in the preferred embodiment.

DETAILED DESCRIPTION OF THE PREFERRED EMBODIMENT

Figure 1:
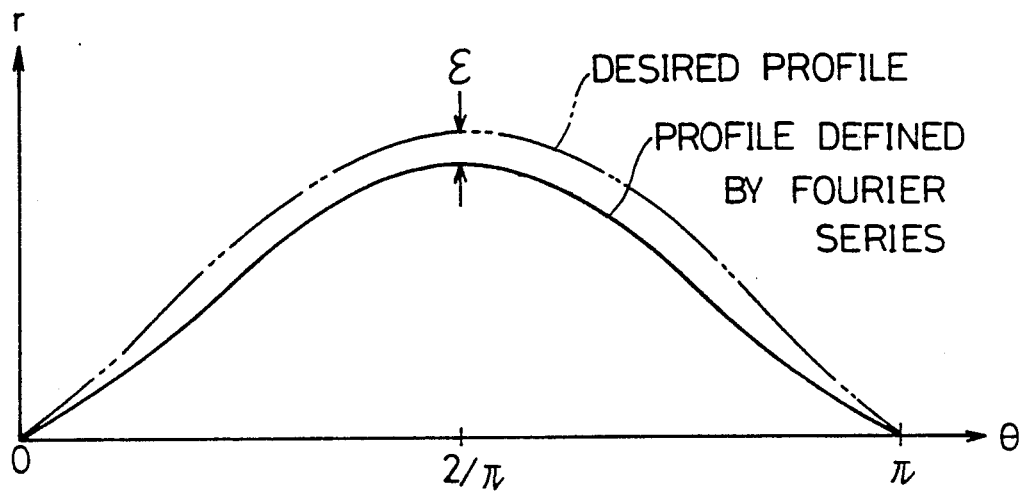
FIG. 1 (a) is an explanatory chart showing an error in command value calculation.
Figure 1:
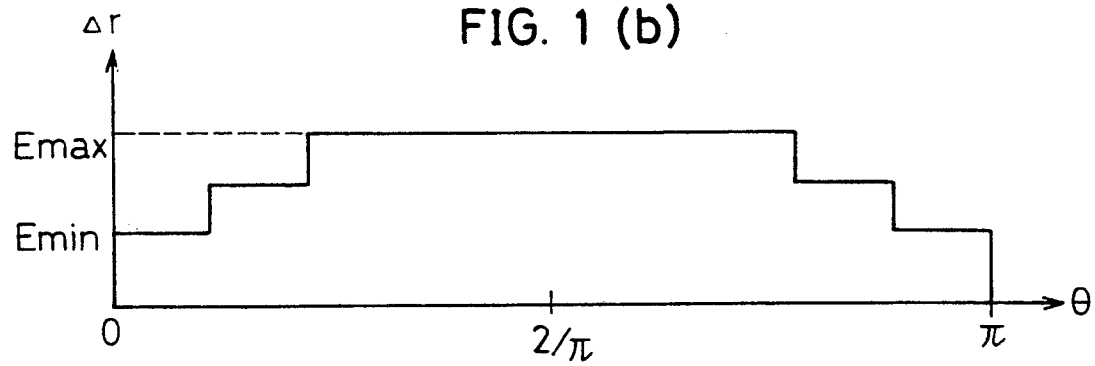
Figure 2:
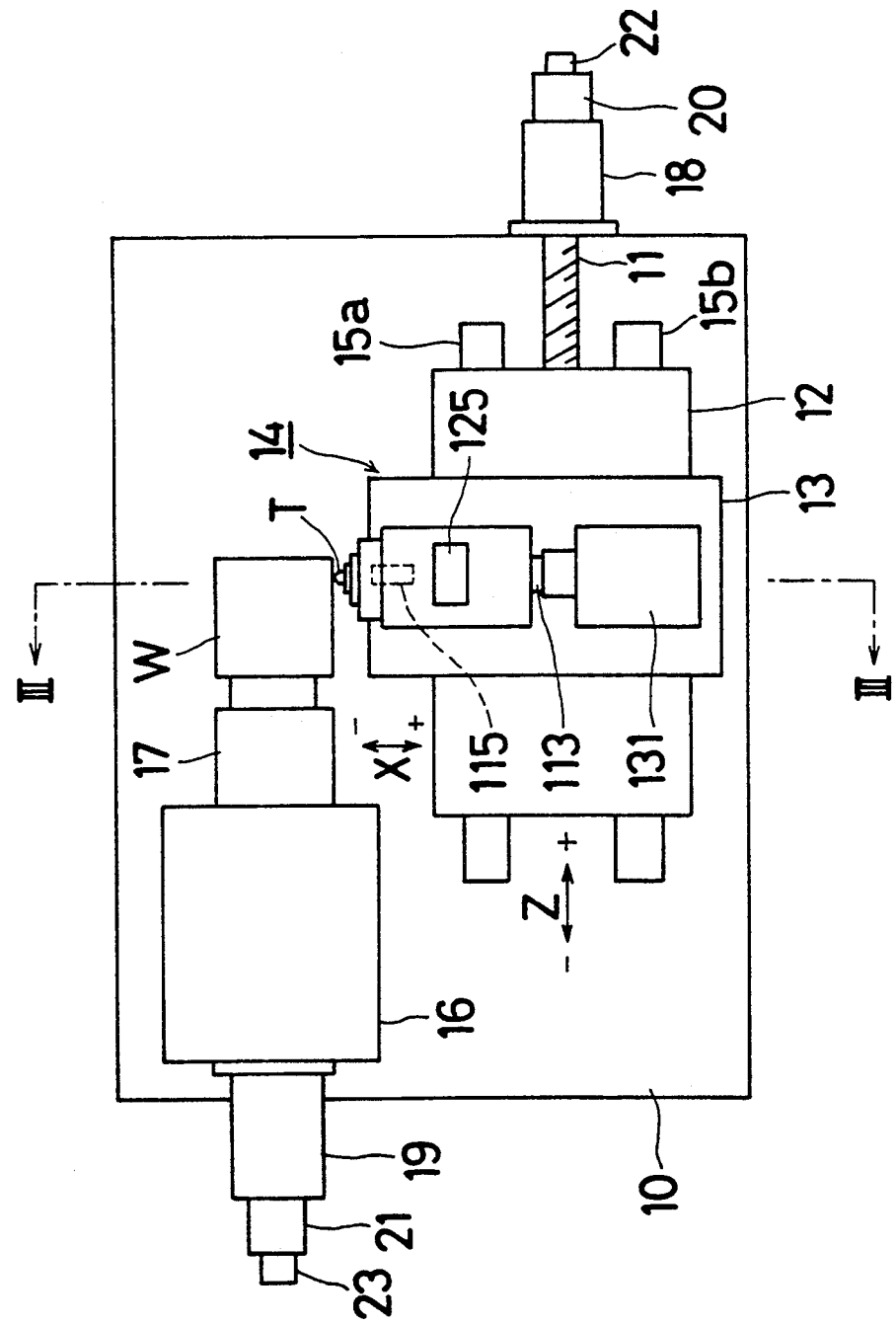
FIG. 2 is a diagrammatic representation showing an entire construction of a non-circular workpiece machining apparatus according to a preferred embodiment of the present invention.

Referring now to the drawings and particularly, to FIG. 2 thereof, there is shown a mechanical construction of a non-circular workpiece machining apparatus according to a preferred embodiment of the present invention. The apparatus includes a bed 10 and a pair of slide rails 15a and 15b disposed on the bed 10 and extending in the direction of a Z-axis. A tool slide 12 is disposed on the slide rails 15a and 15b for sliding movement in the Z-axis direction and connected to a servomotor 18 through a feed screw mechanism 11. A tool base 13 is placed on the tool slide 12, and a tool feed mechanism 14 is placed on the tool base 13 to move a cutting tool T back and forth in a X-axis direction perpendicular to the Z-axis direction. A rotational amount of the Z-axis servomotor 18 is detected by a rotary encoder 20, and a detection signal of the rotary encoder 20 is fed back as a position feed back signal to a Z-axis servomotor driving circuit 36 shown in FIG. 5. Meanwhile, a rotational speed of the Z-axis servomotor 18 is detected by a tachometer generator 22, and a detection signal of the tachometer generator 22 is fed back as a speed feedback signal to the Z-axis servomotor driving circuit 36.

A spindle head 16 is disposed on the bed 10, and a spindle 17 is supported on the spindle head 16 for rotation about a rotational axis parallel to the Z-axis direction. The spindle 17 is connected to be rotated by a spindle servomotor 19. A workpiece W such as a piston for an engine is attached to the spindle 17 by a chuck (not shown) in such a way that the rotational phase of the workpiece W coincides with the rotational phase of the spindle 17. The rotational amount of the spindle servomotor 19 is detected by a rotary encoder 21, and a detection signal of the rotary encoder 21 is fed back as a position feedback signal to a spindle motor driving circuit 35 shown in FIG. 5. Meanwhile, a rotational speed of the spindle servomotor 19 is detected by a tachometer generator 23, and a detection signal of the tachometer generator 23 is fed back as a speed feedback signal to the spindle motor driving circuit 35.

With the apparatus, when the spindle 17 is rotated, the cutting tool T is moved back and forth in the X-axis direction in a synchronous relationship with rotation of the spindle 17 so that the workpiece W is machined so as to have a predetermined substantially elliptic cross section. The tool slide 12 is also moved in the Z-axis direction by the Z-axis servomotor 18 so that the workpiece W is machined in a desired cylindrical shape.

Figure 3:
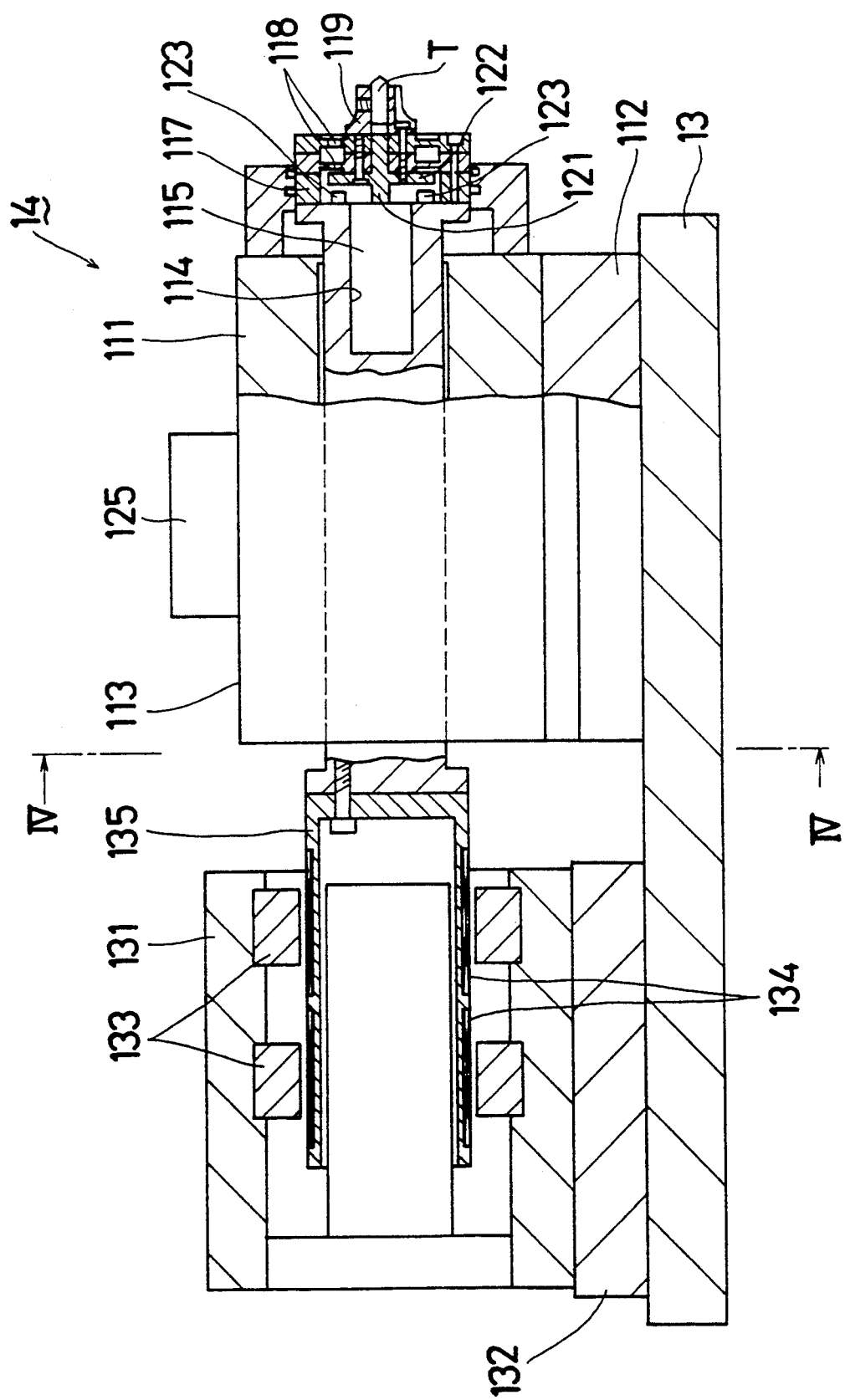
FIGS. 3 is a sectional view taken along a line III—III in FIG. 2.
Figure 4:
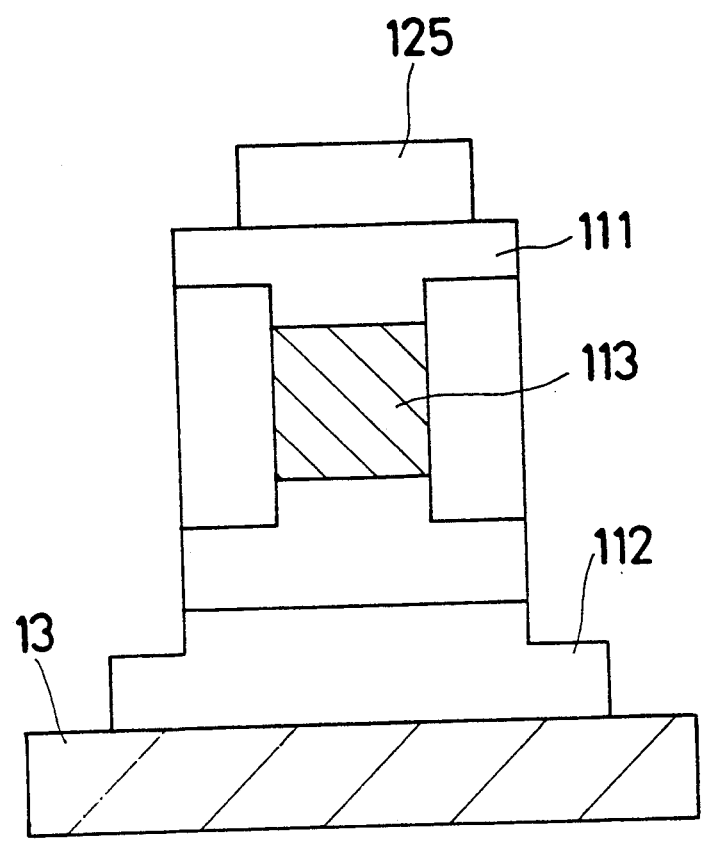
FIG. 4 is a sectional view taken along a line IV—IV in FIG. 3.

The X-axis tool feeding mechanism 14 is shown in detail in FIGS. 3 and 4. A pair of fixed members 112 and 132 are serially arranged in the X-axis direction on the tool table 13. The fixed member 112 supports a hydrostatic bearing unit 111, while the fixed member 132 supports a linear motor 131 such as a voice coil motor, as a low speed actuator. A rum 113 having a rectangular cross section is received by the bearing unit 111 for movement in the X-axis direction, and a piezoelectric actuator 115 is disposed, as a high speed actuator, in a cylindrical hole 114 formed at the forward end of the rum 113. Further, a pair of diaphragm springs 118 are attached through a spacer 117 to the front end surface of the rum 113 so as to support a tool holder 119 to which a tool T is attached. Meanwhile, a pushing member 121 is disposed between the piezoelectric actuator 115 and the pair of diaphragm springs 118 to transmit a force form the piezoelectric actuator 115 to the tool holder 119 through the diaphragms 118. With the construction mentioned above, the tool T is moved forward in the X-axis direction by a force produced by the piezoelectric actuator 115. The diaphragms 118 produces a force to move the tool 120 back to its original position. Numeral 123 indicates a displacement sensor for detecting a movement of the tool T caused by the piezoelectric actuator 115. Also, a position sensor 125 is attached to the bearing unit 111 to detect displacement of the rum 113. The linear motor 131 is composed of a pair of stator magnets 133, and a moving element 135 around which a moving coil 134 is wound. The moving element 135 is connected to the rear end of the rum 113.

Referring now to FIG. 5, a numerical controller 40 is connected to a first drive circuit 41 for driving the linear motor 131, a second drive circuit 42 for driving the piezoelectric actuator 115, and the Z-axis servomotor drive circuit 36 for driving the servomotor 18, though a data bus. The structures and operations of these drive circuits 41, 42 and 36 are the same as those of the linear motor driving circuit, piezoelectric actuator driving circuit and Z-axis driving circuit of the apparatus disclosed in the aforementioned U.S. patent application 07/471,392 U.S. Pat. No. 5,054,340. Therefore, the detailed explanation of the drive circuits 41, 42 and 36 will be omitted hereinafter.

The numerical controller 40 is mainly composed of a central processing unit 50 (herein after referred to as a "CPU"), a data input device 51 such as a key board and tape reader, and a memory 52.

The process of the CPU 50 will be explained hereinafter with reference to flowcharts shown in FIGS. 6 (a) and 6 (b).

At a first step 100, profile data defining a desired final shape of a non-circular workpiece is inputted through the data input device 51. The profile data is composed of plural data prepared for plural angular positions of the workpiece. Each data includes an angular position $\theta$ and a desired radius r indicting a relative position of the tool T, as shown in FIG. 7. The each data also includes an allowable error $\Delta r$.

The desired final shape defined by the profile date is approximately expressed as follows:

$$f(\theta) = a_0 + a_1\cos\theta + b_1\sin\theta + \ldots a_6\cos 6\theta + b_6\sin 6\theta \quad (10)$$

Accordingly, low frequency command values $XTL(\theta)$ to be assigned to the linear motor 131 and high frequency command values $XTP(\theta)$ to be assigned to the piezoelectric actuator 115 are expressed as follows:

$$XTL(\theta) = a_0 + a_1\cos\theta + b_1\sin\theta + a_2\cos 2\theta + b_2\sin 2\theta \quad (11)$$

$$XTP(\theta) = a_3\cos 3\theta + b_3\sin 3\theta + a_4\cos 4\theta + b_4\sin 4\theta + a_5\cos 5\theta + b_4\sin 5\theta + a_6\cos 6\theta + b_6\sin 6\theta \quad (12)$$

At step 102, the coefficients $a_0$ through $b_6$ are determined in such a way that an error of the profile expressed by the above Fourier series becomes smaller than allowable errors.

Based upon the method of least square, following simultaneous equations are assumed at first.

$$\sum_{k=1}^{n} \frac{\partial}{\partial a_0} \{r_k - f(\theta_k)\}^2 = 0 \quad (21)$$

$$\sum_{k=1}^{n} \frac{\partial}{\partial a_1} \{r_k - f(\theta_k)\}^2 = 0 \quad (22)$$

$$\sum_{k=1}^{n} \frac{\partial}{\partial b_1} \{r_k - f(\theta_k)\}^2 = 0 \quad (23)$$

$$\vdots$$

$$\sum_{k=1}^{n} \frac{\partial}{\partial a_6} \{r_k - f(\theta_k)\}^2 = 0 \quad (32)$$

$$\sum_{k=1}^{n} \frac{\partial}{\partial b_6} \{r_k - f(\theta_k)\}^2 = 0 \quad (33)$$

Also weight factor $W_n$ for each angular position $\theta_n$ is calculated based upon an allowable error $r_n$, and the above equations are modified using the weight factor $W_n$. In this embodiment, the weight factor $W_n$ is calculated by the expression $W_n = 1/r_n$, and the modified simultaneous equations are expressed as follows:

$$\sum_{k=1}^{n} \frac{\partial}{\partial a_0} W_k\{r_k - f(\theta_k)\}^2 = 0 \quad (21')$$

$$\sum_{k=1}^{n} \frac{\partial}{\partial a_1} W_k\{r_k - f(\theta_k)\}^2 = 0 \quad (22')$$

$$\sum_{k=1}^{n} \frac{\partial}{\partial b_1} W_k\{r_k - f(\theta_k)\}^2 = 0 \quad (23')$$

$$\vdots$$

$$\sum_{k=1}^{n} \frac{\partial}{\partial a_6} W_k\{r_k - f(\theta_k)\}^2 = 0 \quad (32')$$

$$\sum_{k=1}^{n} \frac{\partial}{\partial b_6} W_k\{r_k - f(\theta_k)\}^2 = 0 \quad (33')$$

From the above simultaneous equations, the following relationship is obtained:

$$[Ma] \begin{bmatrix} a_0 \\ a_1 \\ b_2 \\ \vdots \\ a_6 \\ b_6 \end{bmatrix} = [Mb] \quad (35)$$

wherein the matrix Ma is expressed as follows:

$$Ma = \begin{bmatrix} \sum_{k=1}^{n} W_k & \sum_{k=1}^{n} W_k\sin\theta_k & \cdots & \sum_{k=1}^{n} W_k\cos 6\theta_k \\ \sum_{k=1}^{n} W_k\sin\theta_k & \sum_{k=1}^{n} W_k\sin^2\theta_k & \cdots & \sum_{k=1}^{n} W_k\sin\theta_k\cos 6\theta_k \\ \sum_{k=1}^{n} W_k\cos\theta_k & \sum_{k=1}^{n} W_k\sin\theta_k\cos\theta_k & \cdots & \sum_{k=1}^{n} W_k\cos\theta_k\cos 6\theta_k \\ \vdots & \vdots & & \vdots \\ \sum_{k=1}^{n} W_k\sin 6\theta_k & \sum_{k=1}^{n} W_k\sin\theta_k\sin 6\theta_k & \cdots & \sum_{k=1}^{n} W_k\sin 6\theta_k\cos 6\theta_k \\ \sum_{k=1}^{n} W_k\cos 6\theta_k & \sum_{k=1}^{n} W_k\sin\theta_k\cos 6\theta_k & \cdots & \sum_{k=1}^{n} W_k\cos^2 6\theta_k \end{bmatrix}$$

and wherein the matrix Mb is expressed as follows:

$$Mb = \begin{bmatrix} \sum_{k=1}^{n} W_k r_k \\ \sum_{k=1}^{n} W_k r_k \sin\theta_k \\ \sum_{k=1}^{n} W_k r_k \cos\theta k \\ \cdot \\ \cdot \\ \cdot \\ \sum_{k=1}^{n} W_k r_k \sin 6\theta_k \\ \sum_{k=1}^{n} W_k r_k \cos 6\theta k \end{bmatrix}$$

The coefficients $a_0$ through $b_6$ can be calculated by modifying the above expression as follows.

$$\begin{bmatrix} a_0 \\ a_1 \\ b_2 \\ \cdot \\ \cdot \\ \cdot \\ a_6 \\ b_6 \end{bmatrix} = [Ma]^{-1} [Mb] \quad (36)$$

At the step 102, the coefficients $a_0$, $a_1$, $b_1$... $a_6$, $b_6$ are obtained using the above expression (36). At step 104, low frequence command values are calculated using the expression (11) and coefficients obtained at the step 102. Similarly, at step 106, high frequence command values are calculated using the expression (12) and coefficients obtained at the step 102.

At step 108, the low frequency command values $XTL(\theta)$ are sent to a command memory 46 of the first drive circuit 41 to be stored therein, and the high frequency command values $XTP(\theta)$ are sent to a command memory 47 of the second drive circuit 42 to be stored therein.

After the preparation explained above, a processing for machining operation is started. Namely, at step 200, the CPU 50 commands the spindle motor drive circuit 35 to rotate the spindle 17 at a predetermined speed. When the spindle 17 is rotated, a synchronous signal is outputted from the encoder 21 when ever the spindle 17 rotates by a predetermined amount. The CPU 50 thereafter outputs operation start signals to the first and second drive circuits 41 and 42, at step 202. In response to the start signal, low frequency command values stored in the command memory 46 of the first drive circuit 41 are sequentially read out in synchronous relationship with the rotation of the spindle 17. The read out command value is compared with the present position of the rum 113 detected by the position sensor 125 to drive the linear motor 131, whereby the linear motor 131 is moved in such a way that the difference between the low frequency command value and the present position of the rum 113 becomes zero. Similarly, high frequency command values stored in the command memory 47 of the second drive circuit 42 are sequentially read out in synchronous relationship with the rotation of the spindle 17. The read out command value is compared with the present position of the tool T detected by the displacement sensor 123 to drive the piezoelectric actuator 115, whereby the tool T is moved in such a way that the difference between the high frequency command value and the present position of the tool T becomes zero.

With this operation, the tool T is moved back and forced against the workpiece W in synchronous relationship with the rotation of the workpiece W. After that, the CPU 40 outputs infeed pulses to the first drive circuit 41 so as to move the tool T against the workpiece W, thereby effecting an infeed movement in the X-axis direction. The CPU 40 thereafter outputs command pulses to the Z-axis servomotor drive circuit 36 to rotate the servomotor 18, whereby the tool T is moved in the Z-axis direction to machine the whole area of the outer surface of the workpiece W.

FIG. 8 shows an positioning error of the tool T in the above embodiment. As is clear form the chart, the error is large in an angular area in which the allowance error $\Delta r$ becomes large, but the error is small in angular areas in which the allowance error $\Delta r$ becomes small. Therefore, the number of explanation of the Fourier series can be reduced even when the allowance error is small at certain angular areas. This reduction in the number of extension produces an advantage that the acceleration component of the obtained command values and fluctuation of the acceleration component become small, thereby realizing high speed movement of the tool without unacceptable follow delay thereof. This realizes a high speed machining of a non-circular workpiece with maintaining a high accuracy.

In the above-described embodiment, the low and high frequency command values are prepared, and the tool is moved by a low speed actuator and a high speed actuator which are actuated in accordance with the low and high frequency command values, respectively. However, the present invention can be applied to another type of apparatus in which the tool is moved by a single actuator. In this case, the command values are calculated using the equation (10), and the actuator is driven in accordance with the command values calculated using the equation (10).

Obviously, numerous modifications and variations of the present invention are possible in light of the above teachings. It is therefore to be understood that within the scope of the appended claims, the present invention may be practiced otherwise than as specifically described herein.

What is claimed is:

1. An apparatus for machining a non-circular workpiece wherein a tool is moved back and forth against a workpiece in a synchronous relationship with rotation of the workpiece, said apparatus comprising:

data input means for inputting profile data defining a desired final shape of the workpiece and being composed of plural data prepared for plural angular positions of the workpiece, each of which comprises an angular position of the workpiece and a desired radius;

calculating means for calculating command values indicating positional change of said tool using a Fourier series;

determining means for determining coefficients of the Fourier series using least square method in such a way that difference between a profile defined by the Fourier series and an ideal profile defined by the profile data becomes smaller than a predetermined allowable error;

control means for effecting calculation by said calculating means using coefficients determined by said determining means to obtain command values; and drive means for moving said tool in accordance with the obtained command values to machine the workpiece into the desired final shape.

2. An apparatus for machining a non-circular workpiece according to claim 1, wherein said drive means is composed of a movable member carrying said tool thereon and being movable in a feed direction perpendicular to the rotational axis of the workpiece, a low speed actuator for moving said movable member in the feed direction, a first drive circuit for driving said low speed actuator in accordance with low frequency command values, a high speed actuator disposed between said movable member and said tool for moving said tool in the feed direction with respect to said movable member, and a second drive circuit for driving said high speed actuator in accordance with high frequency command values, and wherein said calculation means is composed of first calculating means for calculating low frequency command values indicating a low frequency component of the profile data using a first Fourier series, and second calculating means for calculating high frequency command values indicating a low frequency component of the profile data using a second Fourier series, and said determining means determines coefficients of the first and second Fourier series.

3. An apparatus for machining a non-circular workpiece according to claim 2, wherein said low speed actuator is a linear motor and said high speed actuator is a piezoelectric actuator.

4. A method for machining a non-circular workpiece with a machine tool having a tool movable in a feed direction perpendicular to the rotational axis of the workpiece, wherein said tool is moved back and forth against the workpiece in a synchronous relationship with rotation of the workpiece, said method comprising steps of:

inputting profile data composed of plural of data prepared for plural angular positions of the workpiece, each of which comprises an angular position of the workpiece and a desired radius, command values indicating positional change of said tool being calculated base upon said profile data using a Fourier series;

determining coefficients of the Fourier series using least square method in such a way that difference between a profile defined by the Fourier series and an ideal profile defined by the profile data becomes smaller than a predetermined allowable error;

effecting a calculation using the Fourier series and coefficients determined at said determining step to obtain command values; and moving said tool in accordance with the obtained command values to machine the workpiece into the desired final shape.

5. An apparatus for machining a non-circular workpiece wherein a tool is moved back and forth against a workpiece in a synchronous relationship with rotation of the workpiece, said apparatus comprising:

data input means for inputting profile data defining a desired final shape of the workpiece and being composed of plural data prepared for plural angular positions of the workpiece, each of which comprises an angular position of the workpiece and a desired radius;

calculating means for calculating command values indicating positional change of said tool using a Fourier series;

determining means for determining coefficients of the Fourier series using least square method in such a way that difference between a profile defined by the Fourier series and an ideal profile defined by the profile data becomes smaller than allowable errors which are given for the plural angular position and which are different from each other;

control means for effecting calculation by said calculating means for using coefficients determined by said determining means to obtain command values; and drive means for moving said tool in accordance with the obtained command values to machine the workpiece into the desired final shape.

6. An apparatus for machining a non-circular workpiece according to claim 5, wherein said determining means comprises means for storing said allowable errors for the plural angular positions, means for calculating weight factors for the plural angular positions based on the said allowable errors, and means for calculating coefficients of the Fourier series using least square method taking said weight factors into consideration.

7. A method for machining a non-circular workpiece with a machine tool having a tool movable in a feed direction perpendicular to the rotational axis of the workpiece, wherein said tool is moved back and forth against the workpiece in a synchronous relationship with rotation of the workpiece in a synchronous relationship with rotation of the workpiece, said method comprising steps of:

inputting profile data composed of plural data prepared for plural angular positions of the workpiece, each of which comprises an angular position of the workpiece and a desired radius, command values indicating positional change of said tool being calculated based upon said profile data using a Fourier series;

determining coefficients of the Fourier series using least square method in such a way that difference between a profile defined by the Fourier series and an ideal profile defined by the profile data becomes smaller than allowable errors which are given for the plural angular positions and which are different from each other;

effecting a calculation using the Fourier series and coefficients determined at said determining step to obtain command values; and moving said tool in accordance with the obtained command values to machine the workpiece into the desired final shape.

* * * * *